United States Patent [19]

Nohara

[11] Patent Number: 4,646,925
[45] Date of Patent: Mar. 3, 1987

[54] MULTI-LAYER PREFORM FOR DRAW-BLOW FORMING A BOTTLE

[75] Inventor: Shigezo Nohara, Yokohama, Japan

[73] Assignee: Toyo Seikan Kaisha, Ltd., Tokyo, Japan

[21] Appl. No.: 655,534

[22] Filed: Sep. 28, 1984

[30] Foreign Application Priority Data

Sep. 29, 1983 [JP] Japan .................... 58-179396

[51] Int. Cl.⁴ .............. B65D 23/00; B32B 1/02; B32B 27/36
[52] U.S. Cl. ................. 215/1 C; 215/12 R; 428/35; 428/542.8
[58] Field of Search ........... 215/1 C, 12 R; 428/35, 428/542.8

[56] References Cited

U.S. PATENT DOCUMENTS

| | | | |
|---|---|---|---|
| 3,221,954 | 12/1965 | Lux | 215/1 C |
| 3,561,629 | 2/1971 | Turner | 215/1 C |
| 3,878,282 | 4/1975 | Bonis et al. | 215/1 C |
| 4,079,850 | 3/1978 | Suzuki et al. | 215/1 C |
| 4,107,362 | 8/1978 | Valyi | 215/1 C |
| 4,149,645 | 4/1979 | Valyi | 215/1 C |
| 4,174,413 | 11/1979 | Yasuike et al. | 215/1 C |
| 4,174,783 | 11/1979 | Abe et al. | 215/1 C |
| 4,256,231 | 3/1981 | Cioc et al. | 215/12 R |
| 4,267,143 | 5/1981 | Roullet | 215/1 C |
| 4,307,137 | 12/1981 | Ota et al. | 428/35 |
| 4,370,368 | 1/1983 | Hirata et al. | 215/12 R |
| 4,391,861 | 7/1983 | Nilsson | 428/542.8 X |
| 4,392,576 | 7/1983 | Berger et al. | 215/12 R |
| 4,451,512 | 5/1984 | Yazaki et al. | 215/1 C |
| 4,483,891 | 11/1984 | Cerny | 428/542.8 X |
| 4,501,781 | 2/1985 | Kushida et al. | 215/1 C |
| 4,528,219 | 7/1985 | Yamada et al. | 428/35 |
| 4,535,901 | 8/1985 | Okudaira et al. | 215/1 C |
| 4,550,043 | 10/1985 | Beck | 215/1 C |

FOREIGN PATENT DOCUMENTS

| | | | |
|---|---|---|---|
| 56-77144 | 6/1981 | Japan | 428/35 |
| 81/00230 | 2/1981 | PCT Int'l Appl. | 215/1 C |

Primary Examiner—William Price
Assistant Examiner—Sue A. Weaver
Attorney, Agent, or Firm—Sherman and Shalloway

[57] ABSTRACT

Disclosed is a multi-layer preform for the production of a bottle by draw-blow forming, which comprises a neck portion having an open end, a part for engagement with a lid member and, if necessary, a supporting ring, and a thick barrel portion to be drawn and a closed bottom portion, wherein the neck portion and inner walls of the bottom and barrel portions are integrally formed of a thermoplastic polyester, a thin intermediate layer composed of a gas-barrier thermoplastic resin is formed on the inner walls of the barrel and bottom portions so that the top end of the intermediate layer is extended to the point just below the neck portion, an outer layer of a thermoplastic polyester is formed in such a positional relation that the outer layer covers the intermediate layer, and a joint is formed directly or through the intermediate layer between the outer layer and the neck portion just below the neck portion.

9 Claims, 8 Drawing Figures

MULTI-LAYER PREFORM FOR DRAW-BLOW FORMING A BOTTLE

BACKGROUND OF THE INVENTION

1. Field of the Invention

The present invention relates to a multi-layer preform for draw-blow forming and a process for the preparation thereof. More particularly, the present invention relates to a preform for the production of a multi-layer polyester drawn bottle excellent in the gas barrier property and for the preparation of this preform.

2. Description of the Prior Art

Drawn polyethylene terephthalate (PET) bottles have been used for carbonated refreshing drinks, beer and whiskey in foreign countries and for not only edible liquids such as soy sauce, other sauces, dressings and edible oils but also non-edible products such as synthetic detergents and cosmetics in Japan. Recently, the use of drawn PET bottles for beer, carbonated refreshing drinks and fruit juices is broadened in Japan as well as in foreign countries.

Since drawn PET bottles are excellent in the transparency, strength, light weight characteristic, gas barrier property and gas pressure resistance, the application fields of drawn PET bottles have been broadened. Even though drawn PET bottles are excellent in the various properties among plastic vessels, since drawn PET bottles are composed of plastics after all, they allow permeation of gases though the permeability is low, and they are inferior to metal cans and glass bottles which are completely gas-impermeable. Accordingly, if a carbonated drink is filled in a drawn PET bottle and the bottle is sealed, there is a limit of the storage period and the distribution period is inevitably limited, with the result that the marketing plan is restricted. In this case, the higher is the carbon dioxide gas pressure and the smaller is the volume of the vessel, the severer is the above restriction.

As means for solving the problem of the gas permeability of a drawn PET bottle, there has been proposed a method in which a polyester layer is laminated with a gas-barrier resin such as an ethylene-vinyl alcohol copolymer or a vinylidene chloride resin. However, various technical problems to be solved are included in the practical production of gas-barrier multi-layer PET bottles, as described below.

A bottomed preform for draw-blow forming is ordinarily prepared by injection molding of a resin. When a multi-layer preform is prepared, injection molding should be conducted for the respective resin layers independently. Furthermore, a certain thickness exceeding the critical value is necessary for injection of a resin (about 0.8 mm is necessary in case of an ethylene-vinyl alcohol copolymer; when the viscosity of the injected ethylene-vinyl alcohol copolymer is low and the injected vessel has a shallow bottom, a thickness of 0.8 mm is necessary, and when a long vessel such as a preform is injected-formed, at least 1 mm is necessary). Accordingly, increase of the thickness of the gas-barrier layer cannot be avoided. If the thickness of the gas-barrier resin layer is increased, the manufacturing cost is increased, and bad influences are imposed in the draw-blowing property of the preform and various properties of the formed drawn bottle. The draw-blowing conditions for the production of a multi-layer PET bottle should naturally be determined based on the drawing conditions of the PET layer. Therefore, if the thickness of the gas-barrier resin layer is increased, because of the difference of optimum drawing conditions between the two resins, the drawing property of the preform is reduced and cracking, breaking or peeling is caused in the gas-barrier resin layer. Therefore, such disadvantages as reduction of the gas barrier property and degradation of the appearance characteristic are brought about.

When a gas-barrier resin layer is laminated on a PET layer, in order to eliminate influences of the humidity on the gas-barrier resin layer, prevent the gas-barrier resin layer from falling in contact with the content and also prevent the gas-barrier resin layer from being broken or damaged, it is preferred that the gas-barrier resin layer be arranged as an intermediate layer. In order to form a preform having this three-layer structure, it is necessary to perform the injection operation in three stages, that is, injection of the inner PET layer, injection of the gas-barrier resin layer and injection of the outer PET layer, while exchanging split molds on a core mold. This operation is very troublesome.

SUMMARY OF THE INVENTION

It is therefore a primary object of the present invention to provide a multi-layer bottomed preform for draw-blow forming, which has a multi-layer structure having inner and outer layers of a polyester and a thin intermediate layer of a gas-barrier resin and which is excellent in the drawing property and gives a drawn bottle excellent in the gas barrier property and other properties, and a process for the preparation of this preform.

Another object of the present invention is to provide a multi-layer preform having a novel structure in which a gas-barrier resin intermediate layer is formed in the barrel and bottom portions of the preform except a neck portion and a joint between the outer layer and the neck portion is formed just below the neck portion, and a process for the preparation of this preform.

Still another object of the present invention is to provide novel means for forming a multi-layer bottomed preform.

In accordance with one fundamental aspect of the present invention, there is provided a multi-layer preform for the production of a bottle by draw-blow forming, which comprises a neck portion having an open end, a part for engagement with a lid member and, if necessary, a supporting ring, and a thick barrel portion to be drawn and a closed bottom portion, wherein the neck portion and inner walls of the bottom and barrel portions are integrally formed of a thermoplastic polyester, a thin intermediate layer composed of a gas-barrier thermoplastic resin is formed on the inner walls of the barrel and bottom portions so that the top end of the intermediate layer is extended to the point just below the neck portion, an outer layer of a thermoplastic polyester is formed in such a positional relation that the outer layer covers the intermediate layer, and a joint is formed directly ot through the intermediate layer between the outer layer and the neck portion just below the neck portion.

In accordance with another fundamental aspect of the present invention, there is provided a process for the preparation of a multi-layer preform, which comprises forming from a thermoplastic polyester a preliminary preform comprising a neck portion having an open end, a part for engagement with a lid member and, if necessary, a supporting ring, a barrel portion having an inner wall dimension corresponding to the inner wall of the final preform, a closed bottom portion and a shoulder portion just below the neck portion, forming from a gas-barrier thermoplastic resin a bowl-like member having a concave portion to be engaged with the lower part of the preliminary preform and having a thick portion on the peripheral edge of an opening thereof and a thin portion below the thick portion, placing an assembly formed by engaging the bowl-like member with the lower portion of the preform in a mold member in such a positional relation that a vacant space is formed between the outer circumferential wall of the mold member and the thin portion of the bowl-like member and there is no substantial vacant space between the outer circumferential wall of the mold member and the thick portion of the bowl-like member, and injecting a thermoplastic polyester into the vacant space between the outer circumferential wall of the mold member and the thin portion of the bowl-like member to extend the gas-barrier resin of the bowl-like member to the shoulder portion along the outer circumferential wall of the preliminary preform, whereby an intermediate layer is formed and simultaneously, an outer layer of the polyester is formed on said intermediate layer.

In the drawings, reference numerals represent the following members or parts.

5: neck portion, 6: barrel portion, 7: bottom portion, 8: inner layer, 9: intermediate layer, 10: outer layer, 20: preliminary preform, 21: core, 22a and 22b: split molds, 23a and 23b: split molds, 26: bowl-like member, 27: thick portion, 28: thin portion, 33a and 33b: split molds, 36: multi-layer bottle.

DETAILED DESCRIPTION OF THE PREFERRED EMBODIMENTS

Figure 1:
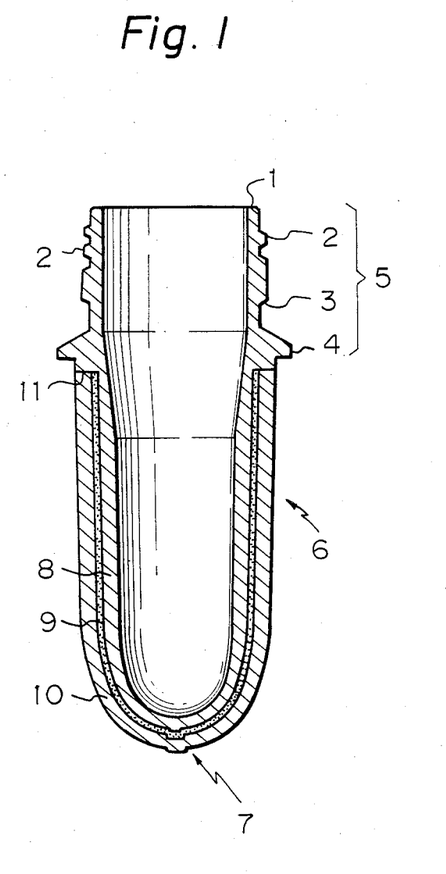
FIG. 1 is a sectional view of a multi-layer preform according to the present invention.

Referring to FIG. 1 showing the multi-layer preform according to the present invention, this preform comprises a neck portion 5 having an open end 1, a capengaging screw 2, a shoulder portion 3 and a supporting ring 4, a thick barrel portion 6 to be drawn, and a closed bottom portion 7.

This neck portion 5 is formed solely of a polyester, while the barrel portion 6 and closed bottom portion 7 below the neck portion 5 have a laminate structure having a polyester inner layer 8, a gas-barrier resin intermediate layer 9 and a polyester outer layer 10. The neck portion 5 and the polyester inner layer 8 are integrally formed, and the gas-barrier layer resin intermediate layer 9 is thinly formed by the ironing injection method described hereinafter so that the top end is extended to the point just below the neck portion. The outer layer 10 and the neck portion 5 are connected to each other directly or through the intermediate layer just below the neck portion to form a joint 11.

According to a preferred embodiment, as shown in the sectional view of FIG. 1, the outer layer 10 is continuous to the neck portion 5 just below the neck portion, with the result that the intermediate layer 9 of the gas barrier resin is completely sealed and surrounded by the polyester inner layer 8 and outer layer 10. In this embodiment, disadvantages caused by the exposure of the gas-barrier resin intermediate layer to outer air, such as reduction of the gas barrier property and deterioration of the food, can be prevented. In this embodiment, since the neck portion and the outer layer are formed of the same polyester and they are fusion-bonded in a mold, it sometimes happens that the joint 11 is not observed with the naked eye.

The method for forming this preform will now be described with reference to FIGS. 2 through 7.

Figure 2:
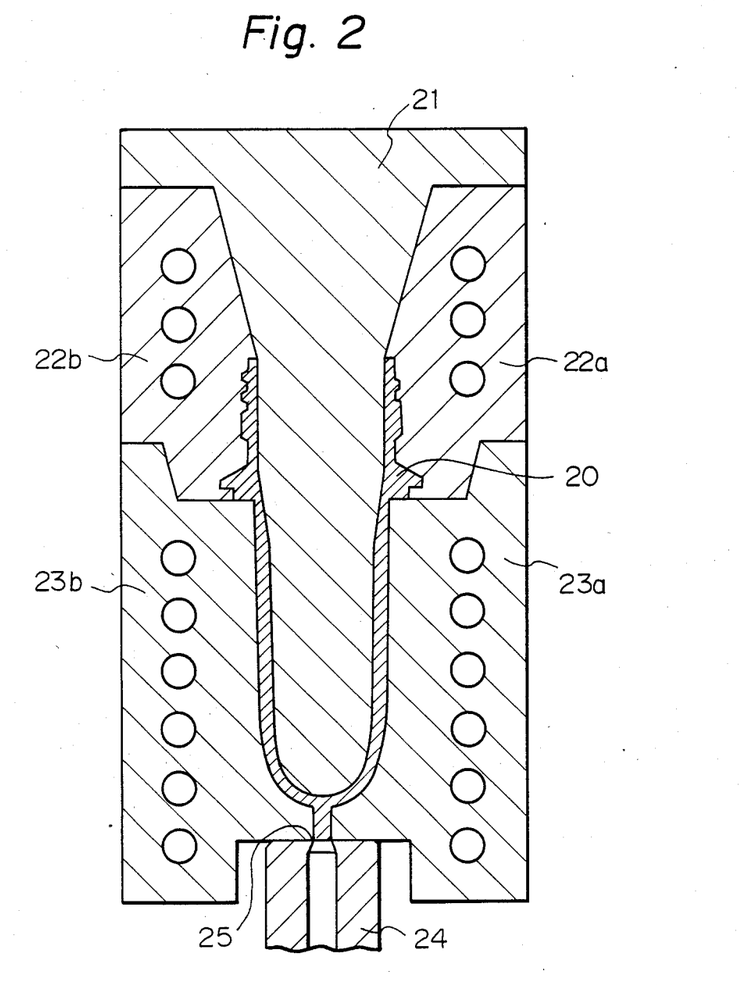
FIG. 2 is a sectional view showing a main part of an injection molding apparatus for forming a preform according to the present invention.

FIG. 2 shows the injection forming method for forming a preliminary preform 20 to be used in the present invention. The mold for this injection forming comprises a core 21 defining the inner wall face of the preform 20, split molds 22a and 22b defining the outer wall face of the neck portion 5, and split molds 23a and 23b defining the outer wall faces of barrel and bottom portions of the preliminary preform 20.

In this preliminary preform 20, the inner layer 8 and neck portion 5 shown in FIG. 1 are integrated, and the preform 20 has a shoulder 15 (FIG. 4) in the boundary between the inner layer 8 and the neck portion 5. Referring to FIG. 2, the preform 20 is formed by injecting a polyester into a cavity of the above-mentioned mold through a nozzle 24 and gate 25 of the injection molding machine and cooling the resin.

Figure 3:
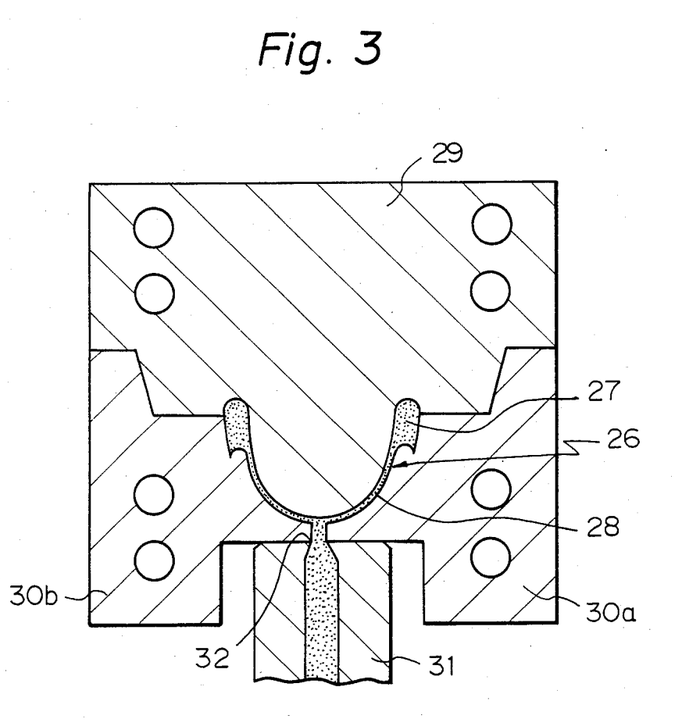
FIG. 3 is a sectional view showing a main part of an injection molding apparatus for forming a bowl-like member to be used for formation of an intermediate layer.

FIG. 3 shows the injection molding method for forming a bowl-like member 26 to be used for formation of the intermediate layer 9 in the present invention. This bowl-like member 26 is formed of a gas-barrier resin, and the bowl-like member 26 has a thick portion 27 on the circumferential edge and a thin portion 28 below the thick portion 27. The mold for forming this bowl-like member 26 comprises a mold 29 defining the concave inner face of the bowl-like member 26 and split molds 30a and 30b defining the outer face of the bowl-like member 26. The bowl-like member 26 is formed by injecting a gas-barrier resin into a cavity of the assembled mold through a nozzle 31 and gate 32 of the injection molding machine and cooling and solidifying the resin.

Figure 4:
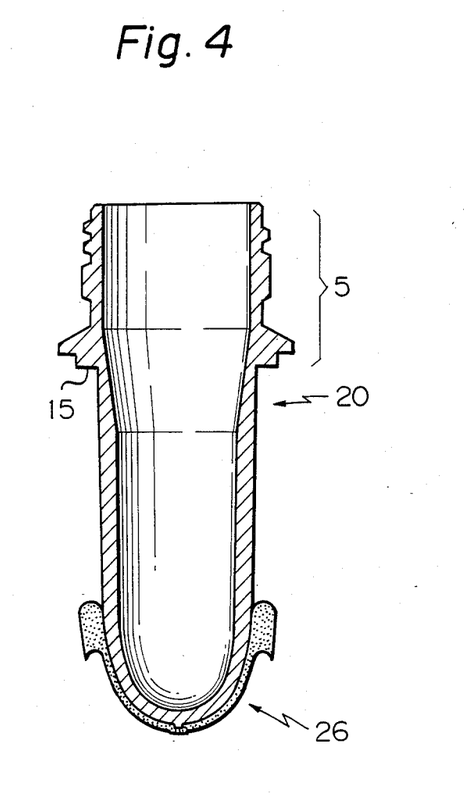
FIG. 4 is a sectional view showing an assembly formed by engaging a bowl-like member with a preliminary preform.

The concave inner face of the bowl-like member 26 is quite in agreement with the round bottom portion of the preliminary preform 20, and the concave portion has a short size substantially covering only the bottom portion of the preliminary preform 20. FIG. 4 shows an assembly formed by fitting the bowl-like member 26 on the lower portion of the preliminary preform 20.

Figure 5:
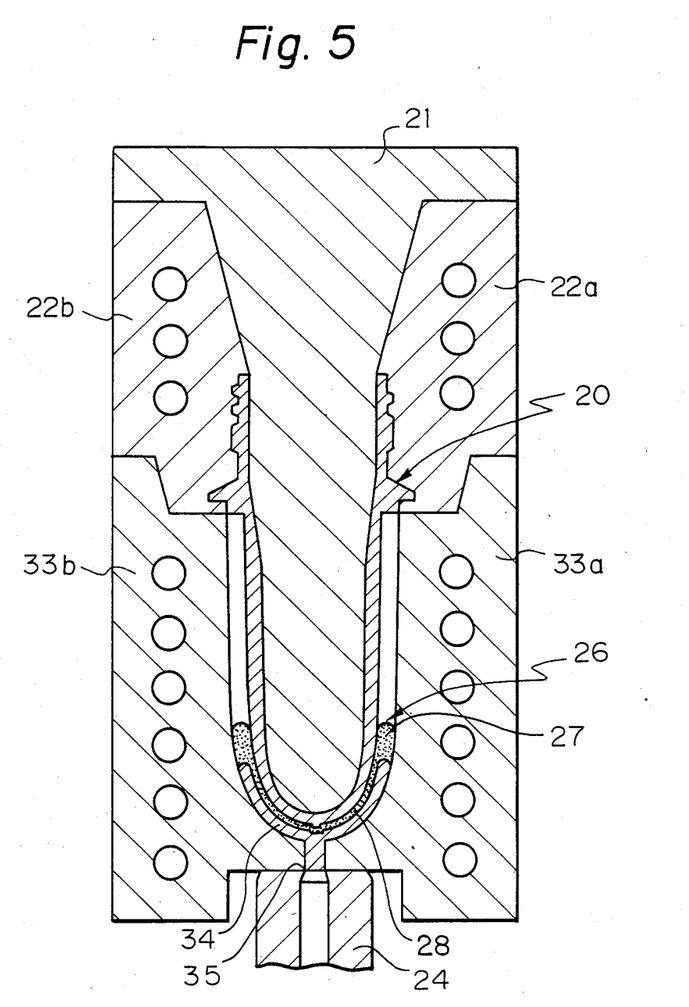
FIGS. 5 through 7 are sectional views showing a main part of an injection molding apparatus for forming a final preform.

FIG. 5 illustrates the novel method in which injection forming is carried out in a mold for forming a final preform by using this assembly. In this mold for forming a final preform, a core mold 21 and neck portion-holding split molds 22a and 22b are the same as those described hereinbefore with reference to FIG. 2, and split molds 33a and 33b defining the outer wall faces of the barrel and bottom portions have a larger size than the size of the split molds 23a and 23b shown in FIG. 2. Of course, the clearance between the inner circumferential face of the split molds 33a and 33b and the core mold 21 corresponds to the thickness of the final preform. Among the inner volme V of the cavity, the volume V1 of the inner layer portion 8, the volume V2 of the bowl-like member 26, that is, the volume V2 of the intermediate layer portion 9, and the volume V3 of the outer layer portion 10, the following relation is established:

$$V = V1 + V2 + V3$$

In the present invention, as is clearly shown in FIG. 5, the assembly is located in the mold in such a positional relation that a vacant space 34 is formed between the inner circumferential face of the split molds 33a and 33b and the thin portion 28 of the bowl-like member 26 and there is no substantial vacant space between the inner circumferential face of the molds 33a and 33b and the thick portion 27 of the bowl-like member 26.

Positioning of the assembly comprising the preliminary preform 20 and the bowl-like member 26 is accomplished by taking out the split molds 23a and 23b after forming the preliminary preform 20 shown in FIG. 2, fitting the bowl-like member 26 in the lower portion of the preliminary preform 20 held by the core mold 21 and split molds 22a and 22b and closing the split molds 33a and 33b as shown in FIG. 5. Positioning may also be accomplished, as shown in FIG. 4, by assembling the preliminary preform 20 and bowl-like member 26 prepared independently by the injection forming, inserting the assembly into the core mold 21 and closing the split molds 22a and 22b and the split molds 33a and 33b.

After completion of the above-mentioned positioning, a polyester resin is injected into the above-mentioned vacant space 34 in the mold through the nozzle 24 and gate 35 of the injection forming machine. At this injection of the polyester resin, the oxygen-barrier resin constituting the bowl-like member 26 is heated and softened by the polyester in the molten state, and the pressure for injection of the polyester resin is applied to the circumferential edge thick portion 27 of the bowl-like member 26. Accordingly, with advance of injection of the polyester resin, as shown most clearly in FIG. 6, the oxygen-barrier resin is thinned and extended along the side wall portion of the preliminary preform 20 and the polyester resin outer layer 10 is formed on this thinned gas-barrier resin intermediate layer 9.

Figure 6:
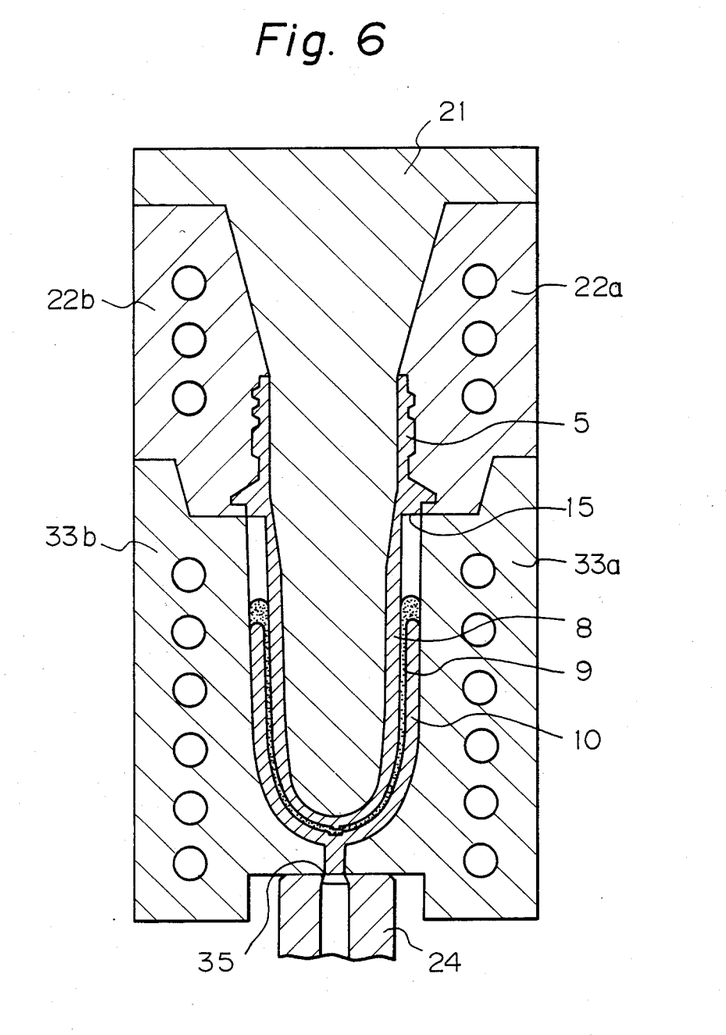

This operation is conducted until the gas-barrier resin constituting the bowl-like member 26 is extended to the shoulder portion 15 just below the neck portion and the cavity in the mold is filled completely with the polyester resin.

Figure 7:
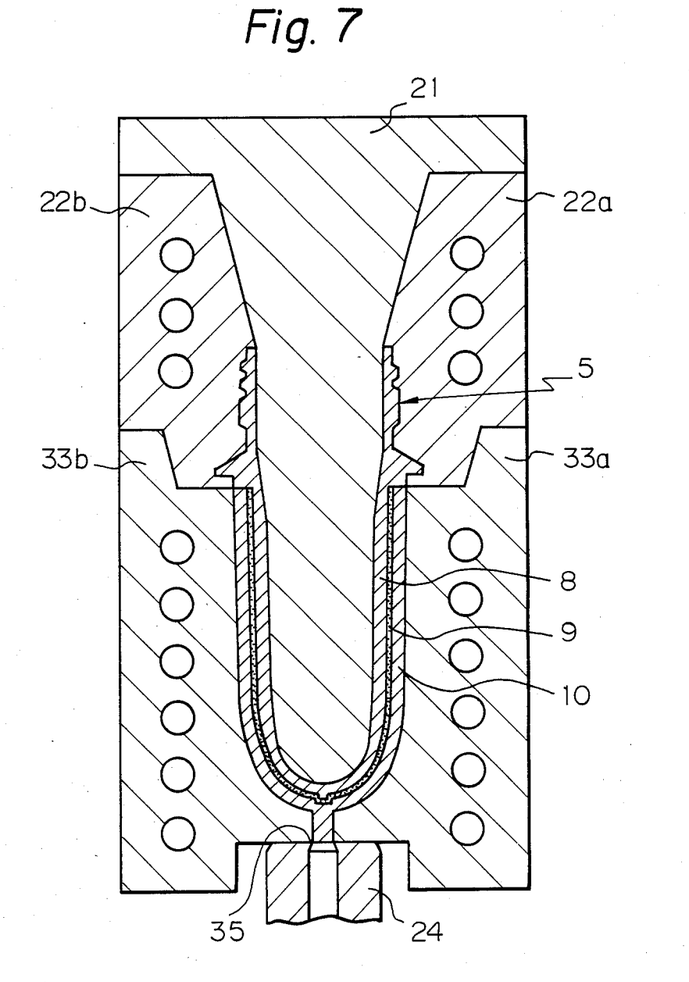

When the cavity in the mold is filled with the polyester resin, the polyester resin outer layer 10 is connected to the polyester resin neck portion 5 directly or through the resin of the intermediate layer 9 just below the neck portion to form a joint 11, and the injected resin is cooled and solidified in the mold to form a final preform.

In the present invention, the property of the gas-barrier resin that the gas-barrier resin is easily extended under a relatively small stress (melt tension) without breaking is utilized, and the pressure for injection of the outer layer polyester resin is utilized for reduction of the thickness of the gas-barrier resin by extending. According to this injection forming process of the present invention, a very thin intermediate layer of a gas-barrier resin can be formed, though formation of this thin intermediate layer is very difficult according to the conventional multi-layer injection forming method.

More specifically, in the conventional multi-layer injection forming method, a minimum thickness is determined while taking the cooling solification speed of the resin in the mold into consideration. In case of a gas-barrier resin intermediate layer, this minimum thickness is ordinarily 0.8 mm, and it is technically difficult to reduce the thickness below this critical value. In case of an ethylene-vinyl alcohol copolymer, a thickness of about 15 to about 30µ is sufficient for attaining a gas-barrier effect to the content, though this thickness differs to some extent according to the gas permeability of the resin used or the draw ratio. It is obvious that in the conventional multi-layer injection forming method, a gas-barrier intermediate layer having a thickness much larger than the necessary thickness has to be formed.

In contrast, according to the present invention, by thinning and extending the intermediate layer resin by the pressure for injection of the outer layer resin, the thickness of the intermediate resin layer can be adjusted to an optional level necessary for attaining the intended gas-barrier effect. Therefore, the amount used of the expensive gas-barrier resin can be saved, and the cost of the preform, that is, the cost of the bottle, can be reduced.

Furthermore, the conditions for draw-blowing the multi-layer preform are selected so that these conditions will match drawing conditions for the inner and outer resin layers which substantially constitute the preform. For example, the draw-blowing temperature for a multi-layer polyester preform is adjusted to 85° to 120° C., which is suitable for drawing the polyester. In the present invention, even if drawing of an oxygen-barrier resin such as an ethylene-vinyl alcohol copolymer is difficult under these conditions, since the gas-barrier resin is present in the form of a very thin layer sandwiched between the polyester layers, the drawing operation can be performed very smoothly without appearance of such defects as cracks, clefts and pinholes.

Prominent advantages are attained in the present invention by the feature that the neck portion and the inner wall are integrally formed by a polyester and a joint is formed between the polyester of the outer layer and the polyester of the neck portion just below the neck portion. More specifically, in the present invention, even if the neck portion is formed solely of the polyester, since this neck portion is not subjected to the drawing operation and a considerable thickness is retained in this neck portion, permeation of gases through this portion can be substantially neglected. Furthermore, in the portion where the thickness is reduced by drawing, the intermediate layer of the gas-barrier resin is present and extended to the point just below the neck portion, and therefore, permeation of gases through this portion is controlled to a very low level.

In the case where a layer of an oxygen-barrier resin is present entirely in the preform, the oxygen-barrier resin is inevitably exposed to the mouth portion of the preform, that is, the mouth portion of a final vessel, and the exposed gas-barrier resin is directly influenced by water or moisture in the vessel (it is considered that the relative humidity in the vessel is 100%) (under a high humidity condition, the gas-barrier property of an ethylene-vinyl alcohol copolymer is drastically reduced). In contrast, according to the present invention, since the neck portion and the inner layer are integrally formed and a joint between the resin of the neck portion and the resin of the outer layer is formed on the periphery just below the neck portion, even if the gas-barrier resin is present in this joint, the terminal of the gas-barrier resin is closed and covered by the polyester and the exposure of the gas-barrier resin to the mouth of the vessel can be prevented.

Furthermore, according to the present invention, since the above-mentioned joint is formed just below the neck portion where the drawing degree is lowest, formation of a score or crack from this joint is not caused and a draw-blow-formed vessel especially excellent in the appearance characteristic can be obtained.

An optional polyester may be used as the thermoplastic polyester in the present invention. Polyesters composed mainly of ethylene terephthalate units, for example, polyethylene terephthalate and crystalline copolymers of ethylene terephthalate containing in the polymer chain small amounts of comonomer units, such as diols other than ethylene glycol, dicarboxylic acids other than terephthalic acid, hydroxycarboxylic acids, diamines and amino acids, are preferably used.

Naturally, the oxygen-barrier resin has an oxygen permeability lower than that of the polyester, and in view of the adaptability to the forming operation, it is preferred that the gas-barrier resin have a melting or softening point lower than the melting point of the polyester.

As preferred examples of the gas-barrier resin, there can be mentioned an ethylene-vinyl alcohol copolymer, a nylon resin, a mixture thereof, a high-nitrile resin and a vinylidene-chloride resin in the order of importance.

In the case where there is no adhesiveness between the two resins, an adhesive resin may be incorporated into the resin constituting the bowl-like member, or the surface of the bowl-like member may be treated with an adhesive resin to form a covering adhesive layer. As the adhesive resin, there may be used a urethane resin, a polyester-ether, a polyester-amide and an acid-modified olefin resin. In the latter case, also the adhesive layer is simultaneously extended.

The thicknesses of the respective portions of the preform will now be described. It is preferred that after draw-blow forming, the thickness of the intermediate layer be ordinarily 3 to 30$\mu$ and especially 5 to 15$\mu$, and if an adhesive resin layer is formed, it is preferred that the thickness of this layer be ordinarily 0.5 to 15$\mu$ and especially 1 to 10$\mu$. Although the thickness of the inner and outer surface layers is changed according to the kind of the resin and the intended use, it is preferred that the thickness of the inner and outer surface layers be ordinarily 800 to 40$\mu$ and especially 400 to 60$\mu$.

Draw-blow forming of the multi-layer preform can be performed by known means. For example, this multi-layer preform is heated to a temperature suitable for draw-blow forming, the neck portion of the multi-layer preform is held by a neck holder in a known blow-forming apparatus, the preform is set in a blow mold and blow-forming is carried out while drawing the preform in the longitudinal direction by a drawing rod, whereby a biaxially drawn multi-layer bottle is formed.

Figure 8:
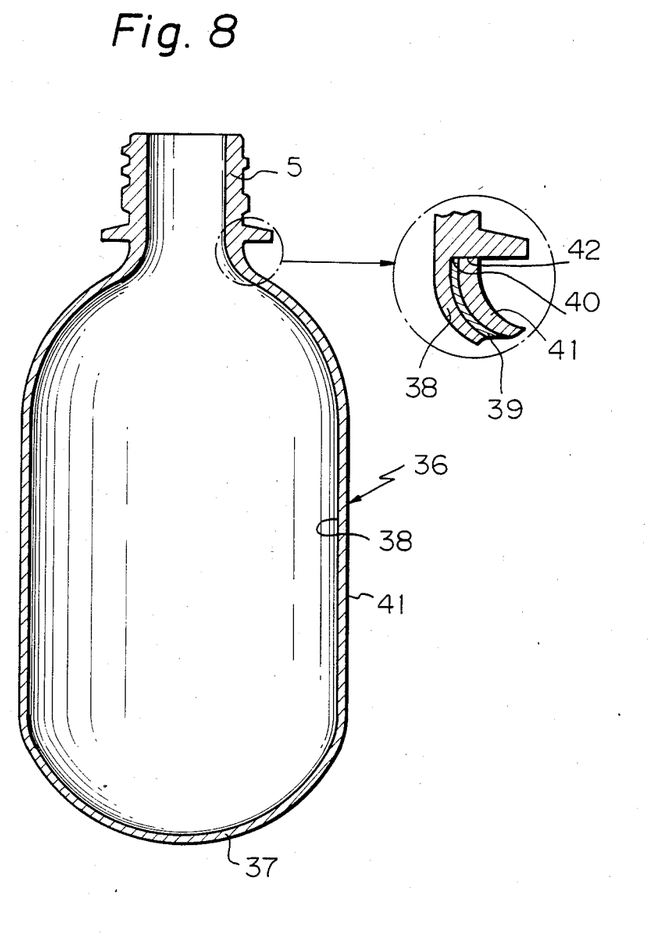
FIG. 8 is a sectional view of a multi-layer bottle.

Referring to FIG. 8 illustrating a multi-layer plastic bottle according to the present invention, this bottle comprises a relatively thick neck portion 5 having an open end 1, parts 2 and 3 for engagement with a lid member and, if necessary, a supporting ring 4, a biaxially molecularly oriented, relatively thick barrel portion 36 and a closed bottom 37. The neck portion 5 and the inner wall 38 of the barrel and bottom portions are integrally formed of a thermoplastic polyester, and a thin intermediate layer 39 composed of a gas-barrier thermoplastic resin is formed on the inner wall 38 of the barrel and bottom portions so that the top end 40 of the intermediate layer 39 is extended to the point just below the neck portion 5. An outer layer 41 of a thermoplastic polyester is formed at a position completely covering the intermediate layer 39, and the outer layer 41 is connected to the neck portion 5 directly or through the intermediate layer 39 to form a joint 42.

The present invention will now be described with reference to the following example.

EXAMPLE

A preliminary preform (having a thickness of 2.0 mm) shown in FIG. 2, which had a step portion just below a neck portion, was prepared by injection forming of polyethylene terephthalate having an intrinsic viscosity of 1.0. Separately, a bowl-like member (having a thickness of 1.0 mm) shown in FIG. 3, which had a concave portion to be engaged with the outer face of the lower portion of the above-mentioned preliminary preform and a thick portion on the circumferential edge of an opening, was prepared by injection forming of an ethylene-vinyl alcohol copolymer (having an ethylene content of 40 mole %).

As shown in FIG. 4, the bowl-like member was fitted in the outer face of the lower portion of the preliminary preform, and polyethylene terephthalate having an intrinsic viscosity of 0.72 was injected to the step portion just below the neck portion to form a three-layer preform shown in FIG. 1, where the ethylene-vinyl alcohol copolymer as the intermediate layer was extended. In the barrel portion of this preform, the average thickness of the inner layer was 2.0 mm, the average thickness of the intermediate layer was 0.3 mm, and the average thickness of the outer layer was 1.5 mm.

This three-layer preform was heated at 105° C. and was treated by the biaxial draw-blow forming method in which the preform was drawn in the lateral direction by blow-forming while drawing the preform in the longitudinal direction, whereby a multi-layer bottle shown in FIG. 8, which had an inner volume of 500 cc, an outer layer thickness of 210$\mu$, an intermediate layer thickness of 30$\mu$ and an inner layer thickness of 250$\mu$, was obtained.

This multi-layer bottle was excellent in the oxygen-barrier property and had a high impact strength against a falling shock.

I claim:

1. A multi-layer preform for the production of a bottle by draw-blow forming, which comprises a neck portion, a thick barrel portion to be drawn and a closed bottom portion, wherein the neck portion and an inner layer of the bottom and barrel portions are integrally formed of a thermoplastic polyester, a thin intermediate layer composed of a gas-barrier thermoplastic resin on the inner layer of the barrel and bottom portions with the top end of the intermediate layer extended to a point just below the neck portion and an outer layer of a thermoplastic polyester in such a positional relation that the outer layer covers the intermediate layer with a fusion-bond joint between the outer layer and the neck portion located just below the neck portion; the intermediate layer of the gas-barrier resin thereby being completely sealed and surrounded by the thermoplastic polyester inner layer and outer layer.

2. A multi-layer preform as set forth in claim 1, wherein the gas-barrier resin is an ethylene-vinyl alcohol copolymer.

3. The multi-layer preform of claim 1 wherein an adhesive resin is incorporated into the thermoplastic resin constituting the gas-barrier intermediate layer.

4. The multi-layer preform of claim 3 wherein the adhesive resin is selected from the group consisting of urethane resins, polyester-ethers, polyester amides, and acid modified olefin resins.

5. The multi-layer preform of claim 1 wherein the intermediate layer has a thickness of 3 to 30μ after draw-blow forming.

6. The multi-layer preform of claim 1 wherein an adhesive resin layer is formed on the surface of the intermediate layer and has a thickness of 0.5 to 15μ after draw-blow forming.

7. The multi-layer preform of claim 6 wherein the adhesive resin is selected from the group consisting of urethane resins, polyester ethers, polyester amides, and acid modified olefin resin.

8. The multi-layer preform of claim 1 wherein the inner and outer surface layers each have thicknesses of 800 to 40μ after draw-blow forming.

9. The multi-layer preform of claim 1 wherein the intermediate layer gas-barrier resin is selected from the group consisting of a mixture of ethylene-vinyl alcohol copolymer and a nylon resin, a high-nitrile resin and a vinylidenechloride resin.

* * * * *